United States Patent [19]

Mochizuki et al.

[11] Patent Number: 5,422,033
[45] Date of Patent: Jun. 6, 1995

[54] PHASE TRANSITION-TYPE LIQUID CRYSTAL COMPOSITION

[75] Inventors: Akihiro Mochizuki; Watanuki Tsuneo, both of Atsugi; Kazumasa Saito, Ebina; Kasumi Ikegami, Sagamihara, all of Japan

[73] Assignee: Fujitsu Limited, Kawasaki, Japan

[21] Appl. No.: 155,274

[22] Filed: Nov. 22, 1993

Related U.S. Application Data

[63] Continuation of Ser. No. 20,438, Feb. 22, 1993, abandoned, which is a continuation of Ser. No. 914,030, Jul. 15, 1992, abandoned, which is a continuation of Ser. No. 465,633, Jan. 22, 1990, abandoned, which is a continuation of Ser. No. 307,161, Feb. 6, 1989, abandoned, which is a continuation of Ser. No. 143,307, Jan. 11, 1988, abandoned, which is a continuation of Ser. No. 770,224, Aug. 28, 1985, abandoned.

[30] Foreign Application Priority Data

Aug. 31, 1984 [JP] Japan .................. 59-180633

[51] Int. Cl.⁶ .................. C09K 17/52; G02F 1/13
[52] U.S. Cl. .................. 252/299.01; 252/299.61; 252/299.63; 252/299.64; 252/299.65; 252/299.66; 252/299.67; 359/85; 359/87; 359/88; 359/90; 359/91; 359/101; 359/102; 359/105

[58] Field of Search ........ 252/299.01, 299.61, 252/299.62, 299.63, 299.64, 299.65, 299.66, 299.67; 359/101, 103, 104, 85, 87, 88, 90, 91, 101, 102, 105

[56] References Cited

U.S. PATENT DOCUMENTS

| | | | |
|---|---|---|---|
| 4,035,056 | 7/1977 | Coates et al. | 350/350 R |
| 4,181,625 | 1/1980 | Petrzilka et al. | 350/350 R |
| 4,261,651 | 4/1981 | Gray et al. | 252/299.63 |
| 4,341,653 | 7/1982 | Inukai et al. | 350/350 R |
| 4,393,258 | 7/1983 | Sato et al. | 252/299.63 |
| 4,410,445 | 10/1983 | Baur et al. | 252/299.61 |
| 4,439,015 | 3/1984 | Rich et al. | 350/350 R |
| 4,482,472 | 11/1984 | Carr et al. | 252/299.63 |
| 4,510,069 | 4/1985 | Eidenschink et al. | 350/350 R |
| 4,512,636 | 4/1985 | Andrews et al. | 350/350 R |
| 4,514,044 | 4/1985 | Guhjima et al. | 350/350 R |
| 4,522,470 | 6/1985 | Iijima | 350/350 R |
| 4,556,745 | 12/1985 | Carr et al. | 252/299.63 |
| 4,565,425 | 1/1986 | Petrzilka et al. | 350/350 R |
| 4,583,826 | 4/1986 | Petrzilka et al. | 252/299.66 |
| 4,602,851 | 7/1986 | Jenner et al. | 350/350 R |
| 4,622,164 | 11/1986 | Eidenschink et al. | 252/299.63 |
| 4,632,515 | 12/1986 | Andrews et al. | 350/350 R |
| 4,659,502 | 4/1987 | Fearon et al. | 252/299.61 |
| 4,695,131 | 9/1987 | Balkwill et al. | 350/350 R |
| 4,698,176 | 10/1987 | Gray et al. | 252/299.61 |
| 4,724,097 | 2/1988 | Romer et al. | 252/299.63 |
| 4,726,911 | 2/1988 | Krause et al. | 252/299.61 |
| 4,737,311 | 4/1988 | Scheuble et al. | 252/299.61 |
| 4,741,859 | 5/1988 | McDonnell et al. | 252/299.63 |
| 4,812,034 | 3/1989 | Mochizuk et al. | 359/87 |
| 5,274,484 | 12/1993 | Mochizuk et al. | 359/87 |

FOREIGN PATENT DOCUMENTS

| | | |
|---|---|---|
| 0035155 | 9/1981 | European Pat. Off. |
| 0058512 | 8/1982 | European Pat. Off. |
| 59-70624 | 4/1984 | Japan ............ 252/299.63 |

*Primary Examiner*—Shean Wu
*Attorney, Agent, or Firm*—Staas & Halsey

[57] ABSTRACT

A phase transition-type liquid crystal composition including a mixture of ester-type liquid crystal compound and chiral nematic liquid crystal compound having added thereto at least one of ethane-type liquid crystal compound and bicyclohexane-type liquid crystal compound. The liquid crystal composition exhibits an extended width ($\Delta V$) of voltage hysteresis and therefore a stabilized homeotropic (H') state, when its voltage hysteresis curve is plotted. The liquid crystal display devices or elements using this composition have a fast response characteristic and enable a large scale or area display and an input operation using keyboards.

20 Claims, 5 Drawing Sheets

LIGHT
F (F$_0$)

DARK
H (H')

CHOLESTERIC→NEMATIC PHASE TRANSITION

NEMATIC→CHOLESTERIC PHASE TRANSITION

PHASE TRANSITION-TYPE LIQUID CRYSTAL COMPOSITION

This application is a continuation of application Ser. No. 08/020,438, filed Feb. 22, 1993, now abandoned, which is a continuation of application Ser. No. 07/914,030, filed Jul. 15, 1992, now abandoned, which is a continuation, of application Ser. No. 07/465,633, filed Jan. 22, 1990, now abandoned. which is a continuation of copending application(s) Ser. No. 07/307,161, filed on Feb. 6, 1989, now which in turn is a continuation of application Ser. No. 07/143,307, filed on Jan. 11, 1988, (now abandoned) which in turn is a continuation of application Ser. No. 06/770,224, filed on Aug. 28, 1985 (now abandoned).

BACKGROUND OF THE INVENTION

1. Field of the Invention

This invention relates to phase transition-type liquid crystal compositions. In particular, this invention relates to cholesteric-nematic phase transition-type liquid crystal composition whose dielectric anisotropies are positive. Surprisingly, liquid crystal devices or elements produced using the liquid crystal composition of this invention may be effectively used in connection with keyboard inputting operations due to their East writing capabilities, and to provide large-scale or area display devices similar to those well-known in the art, such as cathode ray tube (CRT) display devices.

2. Description of the Related Art

A variety of X-Y dot matrix-type liquid crystal display devices based on different display modes have been proposed and used for display purposes. A conventional display modes is the dynamic scattering mode (DSM) which utilizes dynamic scattering effects. Liquid crystal display devices based on DSM, however, cannot be used in connection with large-scale displays. This is because, in large devices, cross-talk is undesirably caused with an increase of display area, and scanning lines, and there is a lower cut-off frequency.

Another display mode, mainly used in the field of liquid crystal displays, is the twisted nematic (TN) mode utilizing twisted nematic effects. However, as in the DSM-type devices, the TN-type liquid crystal devices suffer from cross-talk when they are used in a large-scale dot matrix display, because TN-type liquid crystals have no sudden rise characteristic. This means they are not suitable for large scaled displays. In addition to this, in a large-scale display, TN-type devices suffer from an unusually limited viewing angle and therefore have an unacceptably low contrast characteristic. Such narrowing of the viewing angle coupled with a need for an increase of the number of scanning lines is a critical drawback a need for in large-scale displays and must be overcome.

Numerous researchers have conducted experiments and studies in an effort to overcome the drawbacks of the above-discussed DSM-type and TN-type display devices Such work has led to the development of a new type of liquid crystal display device, i.e., a storage-type liquid crystal device characterized by being capable of maintaining written information or a display in a storage state after a single application of voltage and subsequent removal of the applied voltage (without further application of voltage) as a result of the memory effects of the selected specific liquid crystals. This phenomena enables realization of a large-scale display having as many as 500 or more scanning lines. Such large-scale display could not achieved with the conventional DSM-type and TN-type display devices of an X-Y dot matrix-type.

However, such storage-type liquid crystal display usually requires a driving voltage of ±20 V, an extremely high driving voltage for a liquid crystal display. When attempting to drive such storage-type liquid crystal display with a voltage in the range possible using a complementary metal oxide semiconductor (CMOS), even if writing is possible, essentially no storage time is obtained, making use of such storage-type liquid crystal display element in conjunction with a CMOS system impractical in a commercial sense.

For this reason, the above-mentioned storage-type liquid crystal display could not be driven using a CMOS integrated circuit (IC). Furthermore, while large scale dot matrix display have been possible in principle, because mounting of the driving circuit was difficult, large-scale dot matrix storage-type liquid crystal displays were unavailable for use in actual display devices.

Japanese Unexamined Patent Publication (Kokai) No. 50-159294 discloses a matrix-type liquid crystal device based on a nematic-cholesteric mixed liquid crystal display system, utilizing a Schiff-type cholesteric liquid crystal, for example, cholesteryl chloride. In such liquid crystal device the problem of cross-talk discussed above is avoided and increased contrast characteristics are provided in large-scale displays. However, such device has the drawback that in the case of an X-Y matrix display drive, when the liquid crystal is transferred to a storage state after the completion of the writing of picture, the entire picture becomes temporarily cloudy, e.g., for 10 seconds. The clouding of the entire picture means that the information on the display disappears, even if only temporarily, causing the operator to be uneasy. Furthermore, when the written-in picture is partially rewritten, the rewritten part becomes temporarily cloudy in the same manner each time, making the rewriting operation longer.

Under these circumstances, we found an improved storage-type liquid crystal composition and an improved X-Y dot matrix-type liquid crystal display device using such Liquid crystal composition. Japanese Unexamined Patent Publication (Kokai) No. 59-126492 and the equivalent U.S. application Ser. No. 558,475 filed Dec. 6, 1983, now U.S. Pat. No. 4,547,309 disclose the use of a storage-type liquid crystal composition incorporates a nematic-cholesteric mixture liquid crystal exhibiting a positive anisotropy of dielectric constant. The composition comprises a cyclohexane-type liquid crystal having a high anisotropy of dielectric constant ($\Delta\epsilon$) and a low viscosity ($\eta$), as a nematic liquid crystal; an azoxy-type liquid crystal having an abrupt rising property; and a compensated cholesteric liquid crystal having a large spiral pitch and possessing the property of reducing the viscosity when admixed with the nematic liquid crystal and/or a cholesteric liquid crystal simply possessing the property of reducing the viscosity, such as, for example, cholesteryl oleate.

The storage-type liquid crystal composition of application Ser. No. 558,475 is effective to overcome many of the drawbacks of the above-discussed prior art liquid crystal compositions and devices. In fact, when such storage-type liquid crystal compositions are used, the necessary driving voltage is low, e.g., 7.0 V to 4.4 V, and no temporary clouding occurs. However, this liquid crystal composition is not completely satisfactory, since it can not provide a liquid crystal device having compatibility with the keyboard input system which are conventionally used for input in the display field.

Recently, we found a more improved storage-type liquid crystal display device using a new driving method (cf., for example, Japanese Patent Application No. 59-107404, filed May 29, 1984). The liquid crystal display device, as is disclosed such application, uses as the liquid crystal material a liquid crystal composition comprising 10% to 90% by weight of a cyanobiphenyl-type liquid crystal compound and 7% to 30% by weight of 4-cyano-4'-2-methylbutylbiphenyl-type liquid crystal compound. In such display device, two optical states, i.e., focal-conic or F state (cloudy state) and homeotropic or H' state (transparent state) can be produced and maintained With application of the same retention voltage. It has been found that such composition and such device are useful in connection with large size displays and employing a keyboard input system, provide a high contrast display, and result in the elimination of flicker. One drawback of such device is that stable homeotropic or H' state cannot be attained with application of the retention voltage. In fact, the H' state is metastable and therefore is changed to the focal-conic or F state after about 20 to 30 seconds. It is believed that such a change of state is caused because atmospheric conditions such as humidity, adversely affect the characteristics of the liquid crystal material. Another drawback is that the response speed of the device is relatively slow. It is therefore desirable to provide a still further improved novel liquid crystal composition having none of the drawbacks discussed above.

SUMMARY OF THE INVENTION

According to this invention, there is provided a liquid crystal composition comprising a mixture of an ester-type liquid crystal compound and a chiral nematic liquid crystal compound having added thereto, at least one of an ethane-type liquid crystal compound and a bicyclohexane-type liquid crystal compound.

The liquid crystal composition of this invention exhibits positive dielectric anisotropy and is of a cholesteric-nematic phase transition-type.

Unexpectedly, the described liquid crystal composition has an extended width ($\Delta V$) of voltage hysteresis indicating two stable optical states (F and H'), provides a fast response speed, and enables use of a large scale display and input operation employing keyboards.

DESCRIPTION OF THE PREFERRED EMBODIMENTS

Figure 1:
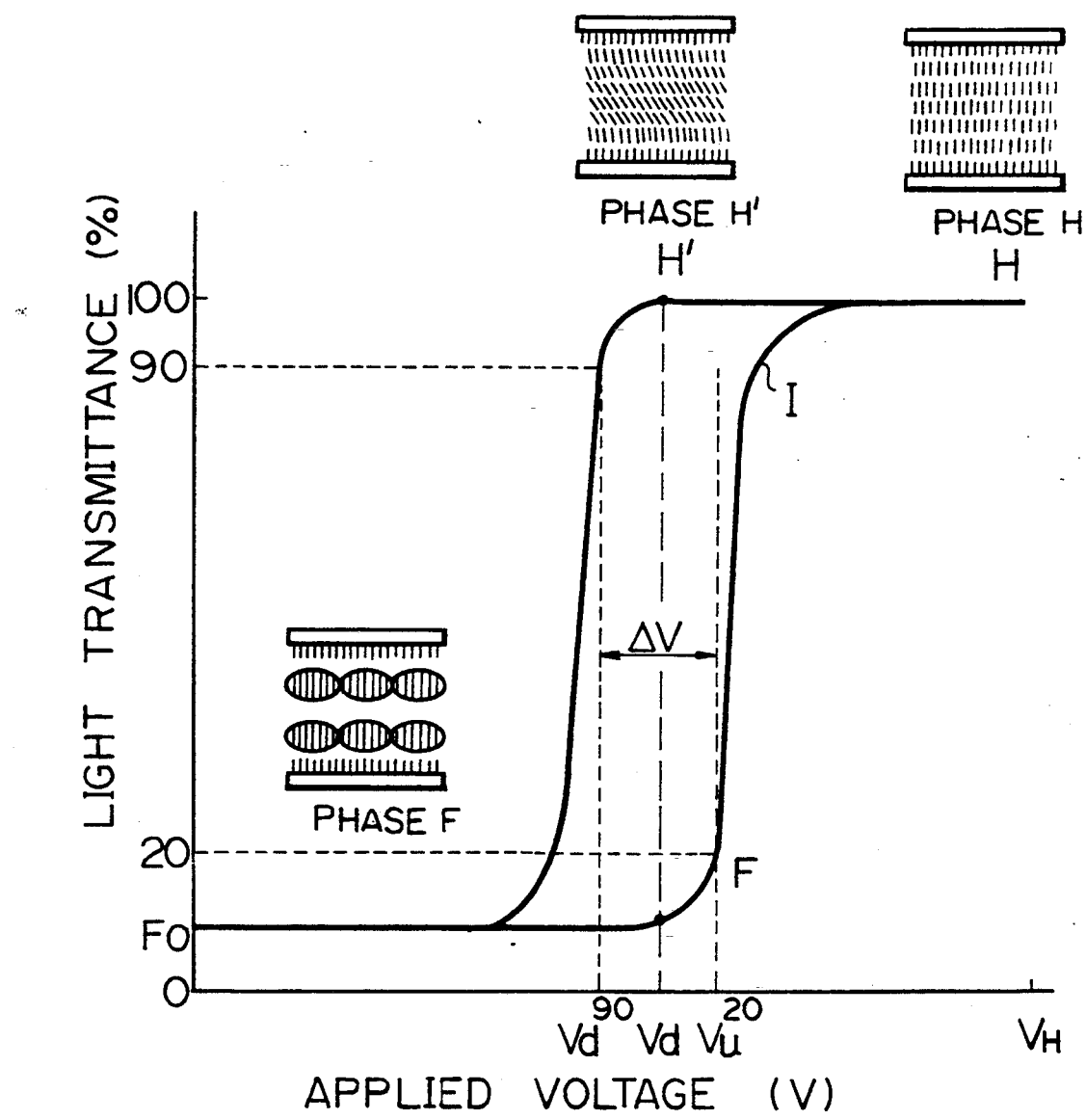
FIG. 1 is a graph illustrating the display principle of the phase transition-type liquid crystal composition of the present invention.

Before discussing of the liquid crystal compounds used in the composition of the present invention, it will be explained how we discovered the described combination of liquid crystal compounds which provides many unexpected effects.

First, in order to achieve stabilization of the metastable homeotropic or H' state, we studied hysteresis curves of cholesteric-nematic mixed liquid crystals. We learned from such study that the H' state will be stabilized if the width ($\Delta V$) of the voltage hysteresis is extended (see FIG. 1). If the voltage hysteresis width ($\Delta V$) is extended conversion of from the H' state to the F state will be effectively prevented, because such extension of width results in a widening of the range of the retention voltage (Vd) to be applied and accordingly facilitates application of the Vd at a higher level. The higher voltage Vd results in a stabilized H' state.

Second, we learned during our study of liquid crystal materials suitable for extension of the voltage hysteresis width ($\Delta V$) that there is a certain relationship between the molecular structure of the liquid crystal compound and the ($\Delta V$) characteristic of the resulting liquid crystal, and therefore that there are limited numbers of the liquid crystal compounds which have the certain molecular structures that result in a largely extended $\Delta V$.

As a result of our study, as described above, we determined that a surprisingly extended width of the voltage hysteresis can be achieved if a mixture of at least one ester-type liquid crystal compound having an ester linkage in its molecular structure and at least one chiral nematic liquid crystal compound is combined with at least one compound selected from the group consisting of ethane-type liquid crystal compounds having an ethylenic linkage, —$CH_2CH_2$—, between two adjacent ring structures and bicyclohexane-type liquid crystal compounds having two directly bonded cyclohexane rings,

In the present invention, the liquid crystal composition containing all of the above-described four liquid crystal compounds is the most preferred. Such preferred composition has a fast writting speed and a wide mesorange, indicating that it is a liquid crystal at room temperature, in addition to a large voltage hysteresis width.

The liquid crystal composition containing three essential components, namely, ethane-type, ester-type, and chiral nematic liquid crystal compounds, has a larger hysteresis width than that of the last-described one, but tends to have a narrower mesorange. Further, a liquid crystal composition containing bicyclohexane-type, ester-type, and chiral nematic liquid crystal compounds is effective to reduce the viscosity of the resulting liquid crystal and extend its hysteresis width, although the degree of hysteresis width extension is smaller than that of the composition of the invention containing only ethane-type liquid crystal compound.

The ethane-type liquid crystal compounds used in the present invention are considered to be effective to extend the voltage hysteresis width $\Delta V$ because of the ethylenic linkage positioned as a central group between two ring structures. In fact, due to the molecular structure of the ethane-type compounds, they can freely move by rotation or flexure. Such compounds freely move due to rotation about the single bond of the ethylenic linkage, stretching vibration, bending vibration, and twisting or wagging. Due to the ethylenic linkage, the two carbon atoms are connected by a single bond, and two carbon tetrahedra are free to rotate about single bond, so various arrangements of their atoms of the molecule arise by rotation about such single bonds, such as staggered conformation, eclipsed conformation or skew conformation. As a result, these ethane-type compounds have increased flexibility and are capable of moderating the conversion from a nematic phase (H' state) to a cholesteric phase (F state). Further, such compounds act stably.

The ethane-type liquid crystal compounds which are useful in the liquid crystal composition of the present invention are represented generally by the following formulas:

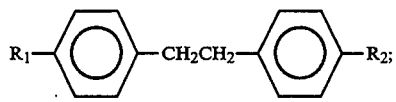

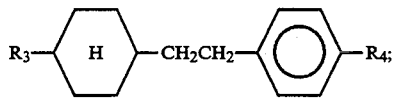

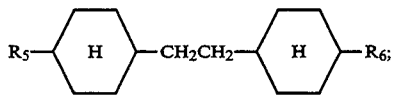

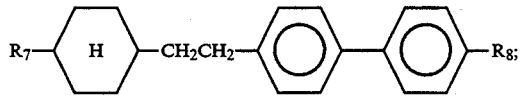

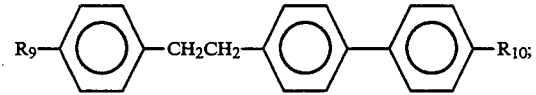

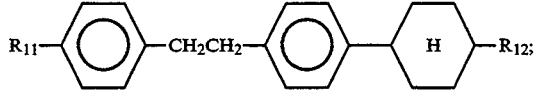

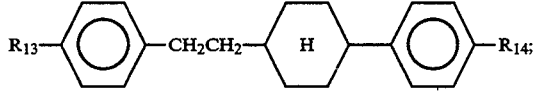

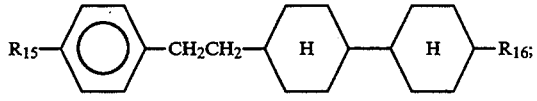

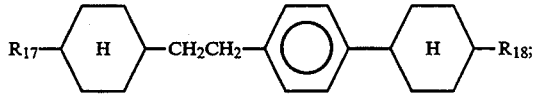

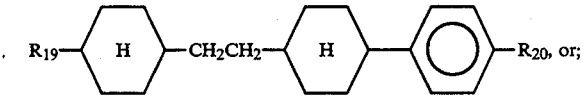

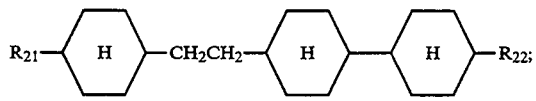

in which $R_1$, $R_3$, $R_5$, and $R_7$ may be the same or different and each represents an alkyl group of 2 to 7 carbon atoms, $R_2$, $R_4$, $R_6$, and $R_8$ may be the same or different and each represents an alkyl group of 2 to 7 carbon atoms, an alkoxy group of 1 to 6 carbon atoms,

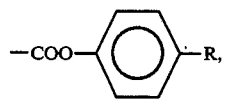

a fluorine atom (F), a bromine atom (Br), or a cyano group (—CN),

R represents an alkyl group of 2 to 7 carbon atoms, a fluorine atom, or a bromine atom, $R_9$, $R_{11}$, $R_{13}$, $R_{15}$, $R_{17}$, $R_{19}$, and $R_{21}$ may be the same or different and each represents an alkyl group of 2 to 7 carbon atoms or an alkoxy group of 1 to 6 carbon atoms, and $R_{10}$, $R_{12}$, $R_{14}$, $R_{16}$, $R_{18}$, $R_{20}$, and $R_{22}$ may be the same or different and each represents an alkyl group of 2 to 7 carbon atoms, a fluorine atom, a chlorine atom, a bromine atom, or a cyano group.

Typical specific examples of the ethane-type liquid crystal compounds useful herein include:

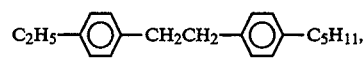

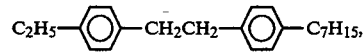

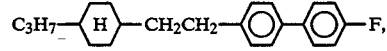

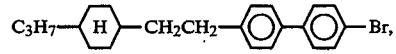

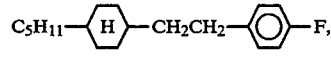

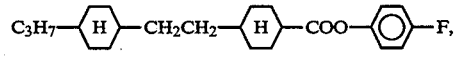

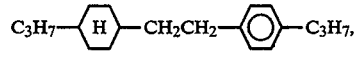

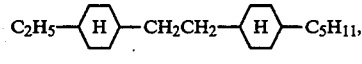

or the like.

The described ethane-type liquid crystal compounds can be used in an amount of about 10% to 70% by weight, preferably about 10% to 40% by weight, based on the total weight of the liquid crystal composition. The above range of the described compounds is the most preferred one for balancing the viscosity characteristics and ensuring a satisfactory mesorange in which the compound acts as a liquid crystal. On the other hand, a wider ΔV (hysteresis width) may be achieved if the compounds are used in any amount exceeding the upper limit. Similarly, the other three liquid crystal compounds discussed in detail hereinafter may also be used in the specified range.

The bicyclohexane-type liquid crystal compounds useful in connection with the present invention, due to their cyclohexane ring structure, can freely move (or flex). This is because the cyclohexane ring structure is capable of assuming two configurations; i.e., chair-type and boat-type, and the molecule is free to change from one such configuration to the other. Bicyclohexane, having, two cyclohexane rings, also revolves freely around their common axis. Further, such compounds may contribute to an extension of the voltage hysteresis width, a reduction of the viscosity of the liquid crystal composition, and a speeding up of writing. They also act stably.

The bicyclohexane-type liquid crystal compounds useful separately, or in combination with the above-discussed ethane-type one in the liquid crystal composition of this invention are represented generally by the formula:

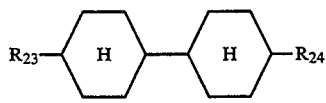

in which $R_{23}$ represents an alkyl group of 2 to 7 carbon atoms and $R_{24}$ represents an alkyl group of 2 to 7 carbon atoms or a cyano group.

Typical examples of specific bicyclohexane-type liquid crystal compounds useful herein are as follows:

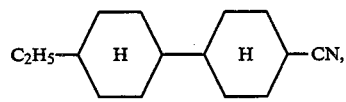

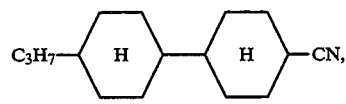

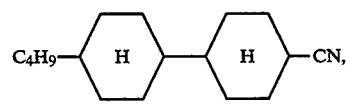

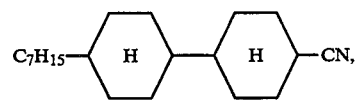

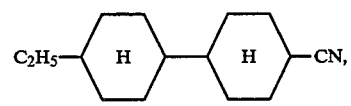

or the like. These liquid crystal compounds may be used in the composition in an amount of about 10% to 60% by weight, preferably about 20% to 40% by weight, based on the total weight of the liquid crystal composition.

Further, the ester-type liquid crystal compounds useful in connection with the present invention can mainly contribute to an extension of the mesorange of the resulting liquid crystal composition when one or more of such compounds are used in combination with the above-discussed ethane-type and/or bicyclohexane-type liquid crystal compounds.

Typical examples of specific ester-type liquid crystal compounds useful in the practice of the present invention are as follows:

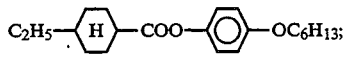

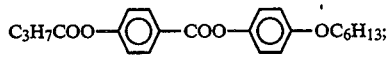

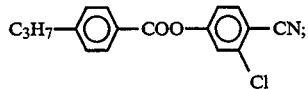

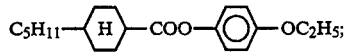

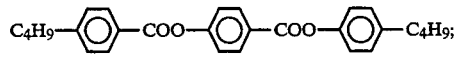

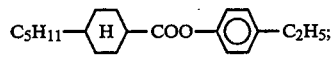

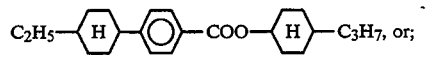

or the like.

Optionally, an oxygen atom of the central group —COO— of the described liquid crystal compounds may be substituted with a sulfur atom to form the corresponding thioester-type liquid crystal compounds, for example:

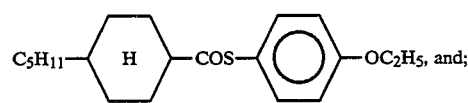

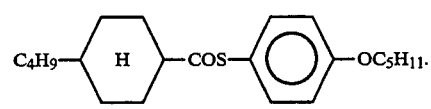

The above-described ester-type and thioester-type liquid crystal compounds can be used in an amount of abut 15% to 85% by weight, preferably about 20% to 55% by weight, based on the total weight of the liquid crystal composition.

Furthermore, the chiral nematic liquid crystal compounds used in the present invention are effectively used to give a helical structure to the resulting liquid crystal composition.

Typical examples of chiral nematic liquid crystal compounds useful in the practice of the present invention are as follows:

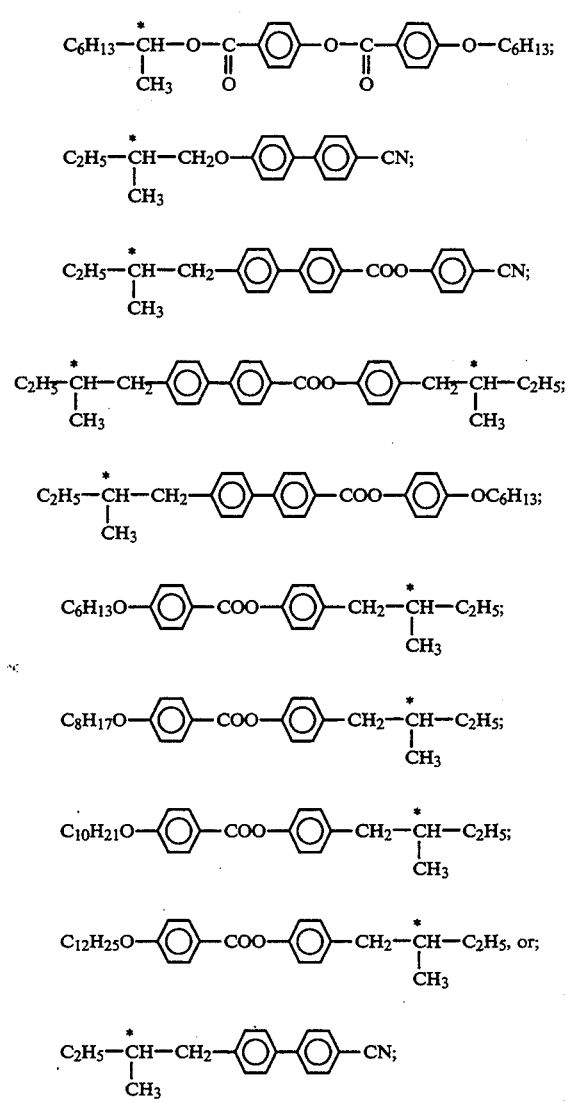

in which C* indicates an asymmetric carbon atom.

These chiral nematic liquid crystal compounds can be generally used in an amount of about 8% to 40% by weight, preferably about 10% to 30% by weight, based on the total weight of the liquid crystal composition. In the production of a cholesteric storage-type liquid crystal display device, they must be used in an amount of from about 4% to 80% by weight, since the chiral nematic liquid crystal compounds belong to a group of the cholesteric liquid crystals.

In the practice of the present invention, if desired, additional amounts of conventional liquid crystal compounds such as biphenyl-type, dioxane-type, pyrimidine-type, cyclohexane-benzene type, terphenyl-type or cyclohexanebiphenyl-type liquid crystal compounds may be added to the liquid crystal composition to improve its characteristics. Practically, we used, some of these conventional liquid crystal compounds as additives in the hereinafter-described working examples.

Generally, the biphenyl-type liquid crystal compounds are effectively used to reduce the required driving voltage, because they have large positive dielectric anisotropys. In particular,

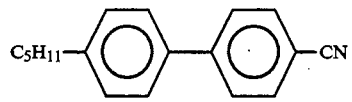

having a low viscosity, is effective to also reduce the viscosity of the resulting liquid crystal composition. These compounds are generally used in an amount of several percent by weight to 20% by weight, because an increase in these compounds having rather straight and hard structures at the central bonds, results in a narrowing of $\Delta V$.

The dioxane-type liquid crystal compounds have a very large dielectric anisotropy and therefore are effective to reduce a driving voltage. However, in phase transition-type liquid crystal, the driving voltage mainly depends on $\Delta \epsilon$ and viscosity, so dioxane-type compounds should not be used in higher amount since they tend to increase the viscosity. Generally, the compounds should be used in an amount of from several percent by weight to 15% or 20% by weight.

Further, it is contemplated to use pyrimidine-type liquid crystal compounds in combination with bicyclohexane-type, ethane-type, or other liquid crystal compounds, to extend the voltage hysteresis, width ($\Delta V$). The freedom of movement in the molecule which is considered to be caused due to heterocyclic compounds contained in the molecule, is in conformity with other liquid crystal compounds. The pyrimidine-type liquid crystal compounds should be used in at most 15% by weight because they have an increased viscosity.

In addition to these conventional liquid crystal compounds, cyclohexane-type liquid crystal compounds may also be useful. The cyclohexane-type compounds, due to their low viscosity, are effectively used to reduce the driving voltage as a result of a reduction of the viscosity of the resulting composition. However, due to the small refractive anisotropy of these compounds, the greater the amount used, the smaller the intensity of light scattering and the lower the contrast. These compounds are preferably used in an amount of from several percent by weight to 20% by weight.

Small amounts, for example 10% by weight or less, of the terphenyl-type or cyclohexanebiphenyl-type liquid crystal compounds are also useful. These compounds can be useful to increase the light scattering intensity. However, the addition of these compounds, due to their high viscosity, results in an increase in the driving voltage.

This invention will be further described with reference to the accompany drawings.

Referring now to the drawings, FIG. 1 illustrates the display principle of the liquid crystal composition according to the present invention. From this illustration it can be seen that the display principle is based on a cholesteric-nematic phase transition phenomenon.

The relationships between light transmittance and applied voltages for nematic-cholesteric phase transition-type liquid crystals having positive dielectric anisotropy are as shown in FIG. 1. By increasing the electric field applied to the liquid crystal, the liquid crystal display panel changes from a cloudy state (cholesteric phase:F) to a transparent state (nematic phase:H). By decreasing the electric field applied to the liquid crystal, the liquid crystal display panel changes from a nematic phase H to a cholesteric phase F via metastable transparent state (nematic phase:H').

At F phase, the liquid crystal in the panel has a spiral or helical structure as shown in FIG. 1, and the helical axis of the liquid crystal structure is parallel to the substrate of the panel. Thus, incident light on the panel is scattered by the liquid crystal and the panel is cloudy. On the other hand, at the H phase the helical structure of the liquid crystal in the panel has dissapated and the liquid crystal molecules are aligned perpendicularly to the substrate of the panel, as shown in FIG. 1. Thus, the liquid crystal has a homeotropic transparent state.

At the H' phase, the liquid crystal has an essentially homeotropic state, but the liquid crystal molecules at the central portion of the liquid crystal mass and away from the substrates of the panel are inclined somewhat relative to the liquid crystal molecules near the substrates panel which are vertically aligned relative to the substrates, as shown in FIG. 1. Thus, at the H' phase, there is difference in the inclination of the liquid crystal molecules between those near the substrate and those at the central portion the mass and away from the substrates of the panel. In this state, a high state of freedom of the movements of the liquid crystal molecule, by rotation, bending or flexing, is useful and effective for stabilizing the retention of the homeotropic transparent state. On the other hand, in such circumstances, the axis of inclination of the liquid crystal molecules having relatively rigid or hard structures at the central portion of the mass during such circumstance is transmitted to the molecules near the panel substrates, and the liquid crystal rapidly changes its phase from homeotropic state to focal-conic state. Further, the H' phase is a meta-stable state resulting in a change to the F phase by such phenomena as heat disturbance. The meta-stability of the H' phase affects the magnitude of the hysteresis effect and stability of the liquid crystal.

To evaluate the magnitude and stability of the hysteresis effect of the liquid crystal, it is necessary to define $\Delta V$. As shown in FIG. 1, $\Delta V$ is defined such that $\Delta V = Vu^{20} - Vd^{90}$ wherein $Vu^{20}$ is the voltage applied to the pane to produce a light transmittance of 20% on the cholesteric→nematic phase transition curve of FIG. 1 and $Vd^{90}$ is the voltage applied to produce a light transmittance of 90% on the nematic→cholesteric phase transition curve of FIG. 1. $\Delta V$ is thus a parameter which indicates the magnitude of the hysteresis.

In the measurement of the voltage hysteresis width ($\Delta V$) which corresponds to the actual driving mode, a two step procedure is used. The first step is made to ascertain the relationship of between light transmittance and applied voltage in the phase transition from cholesteric phase to nematic phase.

Initiates a selected voltage $V_0$ is applied to a selected point of the substrate of the panel and the time dependency of the light transmittance ratio is measured. Next, a voltage $V_1$, which is slightly higher than voltage $V_0$, is applied to the selected point of the panel and again the time dependency of the light transmittance ratio is measured. In the same manner, the voltage applied to the selected point of the panel is gradually and slightly increased until the voltage becomes equal to or higher than the voltage $V_H$, and at each voltage increase the time dependency of the light transmittance ratio is measured.

The light transmittance data for the point in time 10 seconds after the application of the voltage was determined from the data thus obtained, and the relationship between applied voltage and light transmittance was plotted in FIG. 1.

The second step is to ascertain the relationship between light transmittance and applied voltage during the phase transition from the nematic phase to the cholesteric phase.

Measurements were made as in the first step described above, except that the applied voltage to the panel was gradually decreased from a voltage equal or higher than voltage $V_H$, at which voltage the liquid crystal has a completely homeotropic transparent phase, to $V_o$. Thus, the relationship between light transmittance and applied voltage during the nematic→cholesteric phase transition is obtained. From such two step procedure, the hysteresis loop of the nematic-cholesteric phase transition is obtained. Further, $\Delta V$ is determined from the hysteresis loop by measuring the value of the applied voltages $Vu^{20}$ and $Vd^{90}$, respectively.

The display principle of the liquid crystal composition is of the invention is described hereinafter.

Figure 2A:
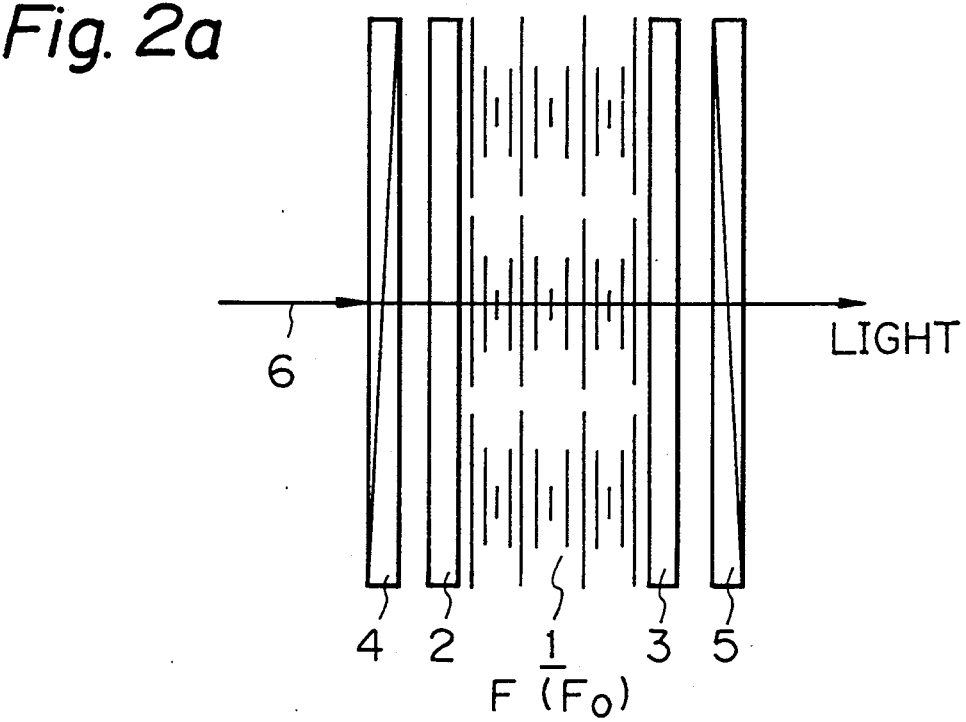
FIGS. 2a and 2b are illustrations showing an example of a liquid crystal driving method using polarizing plates.
Figure 2B:
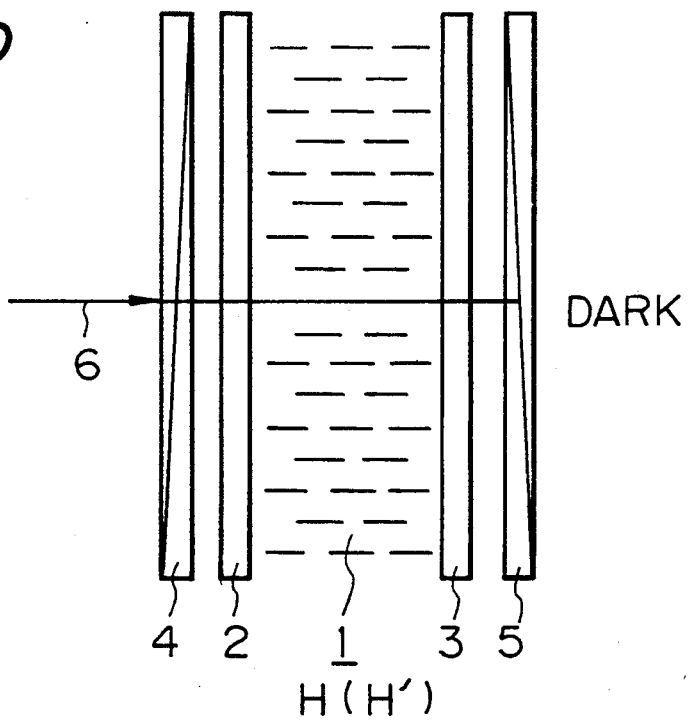

First, a voltage of $V_H (=2 Vd)$ is applied across all electrodes of an X-Y matrix-type liquid crystal display device to cause the liquid crystal 1 to be in its H state, which consists of a nematic phase (see FIG. 1 and FIG. 2b). In the H state, as is shown in FIG. 2b, all molecules of the liquid crystal 1 are orientated in the same direction relative to the direction of electrical field, i.e., in a direction perpendicular to substrates 2 and 3. The incident radiation 6, after successively passing through a polarizing plate 4, the substrate 2, the liquid crystal 1 and the substrate 3, reaches another polarizing plate 5 and stops there. The radiation 6 is not transmitted through the polarizing plate 5 since the plates 4 and 5 have different polarization angles and the difference between such angles is just 90°. Accordingly, liquid crystal 1 is in a dark state.

When the applied voltage is reduced to zero. ($V_o$) liquid crystal 1 its dark state is converted from the H state to the $F_0$ state, which consists of a cholesteric phase (see FIG. 1 and FIG. 2a). After liquid crystal 1, has been converted to the $F_0$ state, the retention voltage $V_d$ is applied thereto to transform the crystal into its F state, which is optically the same as the $F_0$ state. In both the $F_o$ and F states, the liquid crystal 1 has a helical structure, which means that the radiation is rotated or scattered during transmittance. Accordingly, as is shown in FIG. 2a, the radiation 6 is at least partially transmitted through polarizing plate 5. Liquid crystal 1 is thus transformed into its lighted state.

On the other hand, the initial H state can be constantly maintained due to the hysteresis characteristics of the liquid crystal, even if the applied voltage of 2 Vd ($=V_H$) is reduced to Vd. Such new or second H state under the application of the voltage Vd, is particularly referred to herein as the H' state, in order to distinguish it from the H state existing under the applied voltage $V_H$.

As is apparent from the above description, a display device using the liquid crystal composition of this invention exhibits bistable behavior, that is, it has two stable optical states F and H' under the application of the same voltage Vd. Therefore, we can optionally select either one of these states with the application of the voltage Vd.

In the above description, we referred to FIGS. 2a and 2b, and explained the principle of driving the liquid crystal display device of this invention using two polarizing plates. Alternatively, we can drive the liquid crystal display device without using the polarizing plate. This will be described hereinafter referring to FIGS. 3a and 3b.

Figure 3A:
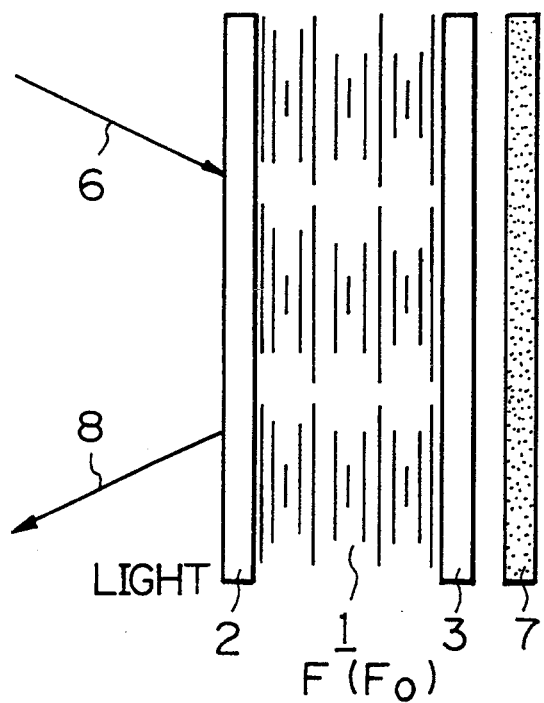
FIGS. 3a and 3b are illustrations showing an example of a liquid crystal driving method using no polarizing plate.
Figure 3B:
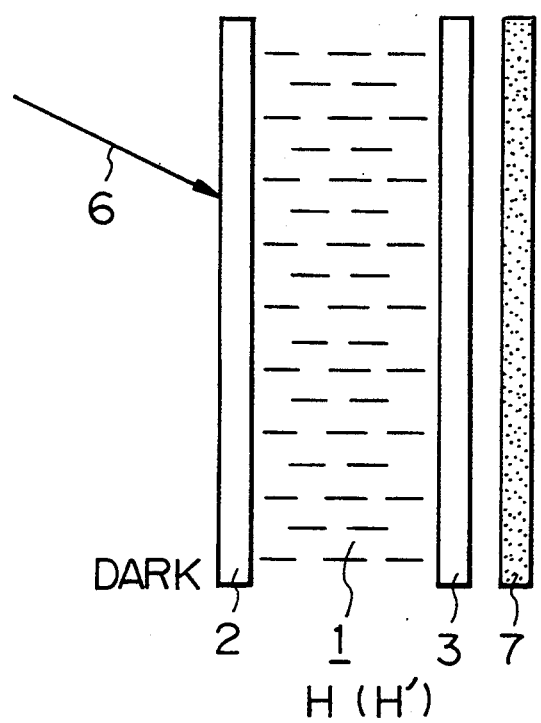

As is illustrated in FIGS. 3a and 3b, the liquid crystal 1 is sandwiched with two substrates 2 and 3 to form a liquid crystal display panel. The back surface of the display panel is provided with a black plate 7. The illustrated liquid crystal display panel, when it is converted to the F or $F_o$ state, is in a lighted state. This is because, as is shown in FIG. 3a, the incident radiation 6 is scattered or reflected upon irradiation on the liquid crystal 1 (the scattered or reflected radiation is indicated with arrow 8) and therefore is not absorbed in the backing black plate 7. On the other hand, the liquid crystal display panel, when the crystal is in its H' or H state as in FIG. 3b, is dark, because the incident radiation 6 is passed through a layer of the liquid crystal 1 and is finally absorbed into the black plate 7. It is contemplated that a lustrous black plate may be used to increase the contrast between the light state and dark state.

EXAMPLES

Hereinafter, the present invention will be furthermore described with reference to some working examples.

The following is a list of the liquid crystal compositions used in the examples, in which the compositions A, B, E, F and G each is a composition within the scope of the present invention, and the compositions $C_1$, $C_2$, D, H and I each is a control composition.

| Liquid Crystal Composition A | |
|---|---|
| Liquid Crystal Compounds | % by weight |
|  | 18.2 |
|  | 18.2 |
|  | 9.1 |
|  | 12.1 |
|  | 9.1 |
|  | 21.2 |
|  | 12.1 |

| Liquid Crystal Composition B | |
|---|---|
| Liquid Crystal Compounds | % by weight |
|  | 6.5 |
|  | 9.8 |
|  | 9.8 |
|  | 9.8 |
|  | 9.8 |
|  | 13.0 |
|  | 3.3 |
|  | 9.8 |
|  | 9.8 |
|  | 6.5 |
|  | 11.9 |

| Liquid Crystal Composition $C_1$ | |
|---|---|
| Liquid Crystal Compounds | % by weight |
|  | 25.0 |
|  | 14.3 |

Liquid Crystal Composition C₁
| Liquid Crystal Compounds | % by weight |
|---|---|
| 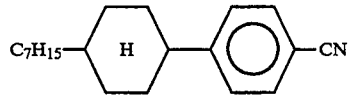 C₇H₁₅—(H)—◯—CN | 17.9 |
| 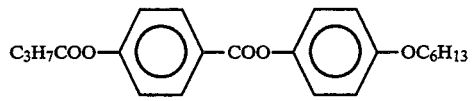 C₃H₇COO—◯—COO—◯—OC₆H₁₃ | 7.2 |
| 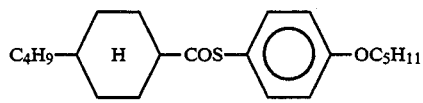 C₄H₉—(H)—COS—◯—OC₅H₁₁ | 7.2 |
| 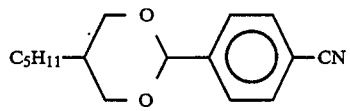 C₅H₁₁—(dioxane)—◯—CN | 16.7 |
| 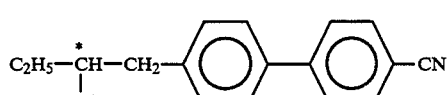 C₂H₅—*CH(CH₃)—CH₂—◯—◯—CN | 11.7 |
Liquid Crystal Composition C₂
| Liquid Crystal Compounds | % by weight |
|---|---|
| 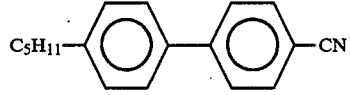 C₅H₁₁—◯—◯—CN | 25.0 |
| 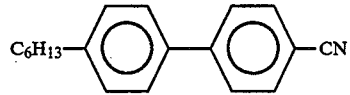 C₆H₁₃—◯—◯—CN | 14.3 |
| 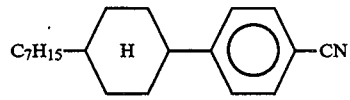 C₇H₁₅—(H)—◯—CN | 17.9 |
| 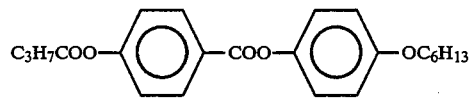 C₃H₇COO—◯—COO—◯—OC₆H₁₃ | 7.2 |
| 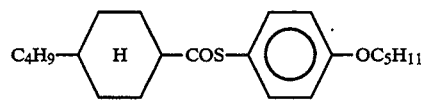 C₄H₉—(H)—COS—◯—OC₅H₁₁ | 7.2 |
| 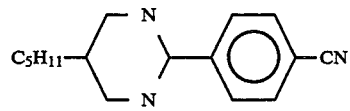 C₅H₁₁—(pyrimidine)—◯—CN | 16.7 |
| 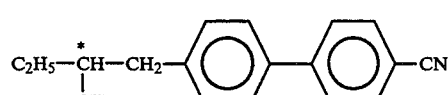 C₂H₅—*CH(CH₃)—CH₂—◯—◯—CN | 11.7 |

| Liquid Crystal Composition D | |
|---|---|
| Liquid Crystal Compounds | % by weight |
| C$_3$H$_7$—⟨H⟩—⟨○⟩—CN | 14.2 |
| C$_5$H$_{11}$—⟨H⟩—⟨○⟩—CN | 14.2 |
| C$_7$H$_{15}$—⟨H⟩—⟨○⟩—CN | 14.2 |
| C$_6$H$_{13}$—(dioxane)—⟨○⟩—CN | 10.6 |
| C$_2$H$_5$—⟨H⟩—⟨○⟩—COO—⟨○⟩—C$_3$H$_7$ | 7.1 |
| CH$_3$O—⟨○⟩—N=N(O)—⟨○⟩—C$_4$H$_9$ | 24.8 |
| C$_{27}$H$_{45}$Br | 7.0 |
| CH$_3$(CH$_2$)$_{12}$COOC$_{27}$H$_{45}$ | 7.9 |

| Liquid Crystal Composition E | |
|---|---|
| Liquid Crystal Compounds | % by weight |
| C$_3$H$_7$—⟨H⟩—(CH$_2$)$_2$—⟨○⟩—⟨○⟩—F | 7.7 |
| C$_2$H$_5$—⟨H⟩—(CH$_2$)$_2$—⟨H⟩—C$_5$H$_{11}$ | 7.7 |
| C$_2$H$_5$—⟨○⟩—(CH$_2$)$_2$—⟨○⟩—C$_5$H$_{11}$ | 7.7 |
| C$_2$H$_5$—⟨○⟩—(CH$_2$)$_2$—⟨○⟩—C$_7$H$_{15}$ | 7.7 |
| C$_3$H$_7$—⟨H⟩—⟨H⟩—CN | 7.7 |

-continued

| Liquid Crystal Composition E | |
|---|---|
| Liquid Crystal Compounds | % by weight |
| 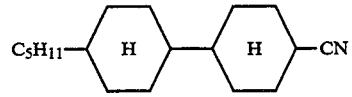 C$_5$H$_{11}$—H—H—CN | 7.7 |
| 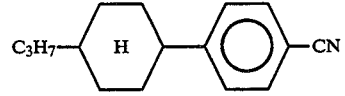 C$_3$H$_7$—H—◯—CN | 7.7 |
| 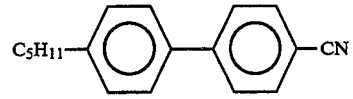 C$_5$H$_{11}$—◯—◯—CN | 7.7 |
| 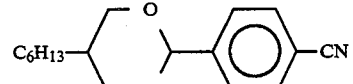 C$_6$H$_{13}$—(dioxane)—◯—CN | 5.1 |
| 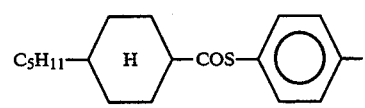 C$_5$H$_{11}$—H—COS—◯—OC$_2$H$_5$ | 2.6 |
| 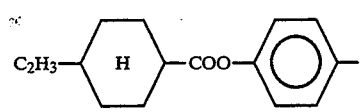 C$_2$H$_3$—H—COO—◯—OC$_6$H$_{13}$ | 2.6 |
|  C$_4$H$_9$—◯—COO—◯—COO—◯—C$_4$H$_9$ | 2.6 |
| 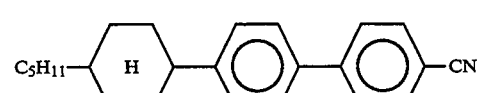 C$_5$H$_{11}$—H—◯—◯—CN | 8.0 |
| 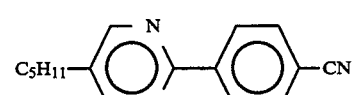 C$_5$H$_{11}$—(pyrimidine)—◯—CN | 2.6 |
| 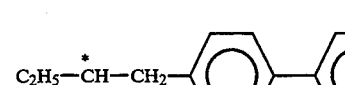 C$_2$H$_5$—*CH(CH$_3$)—CH$_2$—◯—◯—CN | 14.9 |

| Liquid Crystal Composition F | |
|---|---|
| Liquid Crystal Compounds | % by weight |
|  C$_2$H$_5$—H—(CH$_2$)$_2$—H—C$_5$H$_{11}$ | 18.2 |
| 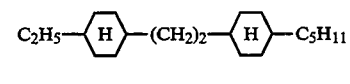 C$_2$H$_5$—◯—(CH$_2$)$_2$—◯—C$_5$H$_{11}$ | 18.2 |
| 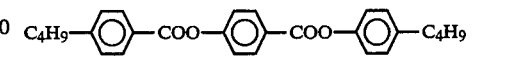 C$_5$H$_{11}$—H—COO—◯—C$_2$H$_5$ | 9.1 |

| -continued | |
|---|---|
| Liquid Crystal Composition F | |
| Liquid Crystal Compounds | % by weight |
| 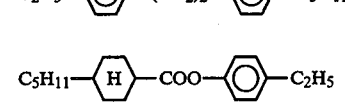 C$_4$H$_9$—◯—COO—◯—COO—◯—C$_4$H$_9$ | 12.1 |
| 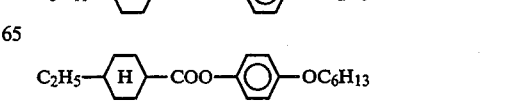 C$_5$H$_{11}$—H—COO—◯—OC$_2$H$_5$ | 9.1 |
|  C$_2$H$_5$—H—COO—◯—OC$_6$H$_{13}$ | 21.2 |

Liquid Crystal Composition F (continued)

| Liquid Crystal Compounds | % by weight |
|---|---|
| C$_2$H$_5$—*CH(CH$_3$)—CH$_2$—〔phenyl〕—〔phenyl〕—CN | 12.1 |

Liquid Crystal Composition G (continued)

| Liquid Crystal Compounds | % by weight |
|---|---|
| C$_2$H$_5$—*CH(CH$_3$)—CH$_2$—〔phenyl〕—〔phenyl〕—CN | 12.8 |

Liquid Crystal Composition H

| Liquid Crystal Compounds | % by weight |
|---|---|
| C$_5$H$_{11}$—〔phenyl〕—〔phenyl〕—CN | 56.1 |
| C$_6$H$_{13}$—[1,3-dioxane]—〔phenyl〕—CN | 12.2 |
| C$_3$H$_7$—〔H〕—〔phenyl〕—C$_2$H$_5$ | 12.2 |
| C$_3$H$_7$—〔H〕—COO—〔phenyl〕—COO—〔phenyl〕—CH$_3$ | 2.4 |
| C$_2$H$_5$—*CH(CH$_3$)—CH$_2$—〔phenyl〕—〔phenyl〕—CN | 17.1 |

Liquid Crystal Composition G

| Liquid Crystal Compounds | % by weight |
|---|---|
| C$_2$H$_5$—〔H〕—〔H〕—CN | 11.4 |
| C$_5$H$_{11}$—〔H〕—〔H〕—CN | 11.4 |
| C$_3$H$_7$—〔H〕—〔H〕—CN | 11.4 |
| C$_4$H$_9$—〔H〕—〔H〕—CN | 11.4 |
| C$_5$H$_{11}$—〔phenyl〕—〔phenyl〕—CN | 18.9 |
| C$_2$H$_5$—〔H〕—COO—〔phenyl〕—OC$_6$H$_{13}$ | 15.1 |
| C$_5$H$_{11}$—〔H〕—COS—〔phenyl〕—OC$_2$H$_5$ | 7.6 |

Liquid Crystal Composition I

| Liquid Crystal Compounds | % by weight |
|---|---|
| C$_2$H$_5$—〔H〕—COO—〔phenyl〕—OC$_6$H$_{13}$ | 8.7 |
| C$_5$H$_{11}$—〔H〕—COO—〔phenyl〕—CN | 5.8 |
| C$_5$H$_{11}$—〔H〕—COO—〔H〕—C$_3$H$_7$ | 8.7 |
| C$_5$H$_{11}$—〔H〕—COO—〔phenyl〕—C$_5$H$_{11}$ | 8.7 |
| C$_4$H$_9$—〔H〕—COO—〔phenyl〕—OC$_2$H$_5$ | 8.7 |
| C$_5$H$_{11}$—〔H〕—COO—〔phenyl〕—OCH$_3$ | 8.7 |
| C$_4$H$_9$—〔H〕—COO—〔phenyl〕—OC$_6$H$_{13}$ | 11.6 |
| C$_5$H$_{11}$—〔phenyl〕—〔phenyl〕—CN | 17.4 |

| Liquid Crystal Compostion I | |
|---|---|
| Liquid Crystal Compounds | % by weight |
| $C_3H_7-\bigcirc-COO-\bigcirc(Cl)-CN$ | 8.7 |
| $C_2H_5-\overset{*}{C}H(CH_3)-CH_2-\bigcirc-\bigcirc-CN$ | 13.0 |

Example 1

Two glass substrates having a ITO (indium oxide $In_2O_3$) coating were first washed with a detergent and then subsequently washed with isopropyl alcohol, acetone, and pure water. These substrates were then treated with oxygen plasma to improve their surface properties. The substrates were then bonded through a spacer of 12 μm thick polyester film, commercially available from E. I. du Pont Co. under the trade name Mylar ®, and sealed with an epoxy adhesive to form a panel. The panel was filled with the above-listed four liquid crystal compositions A, B, $C_1$, and D. Four types of liquid crystal display panels; P-A (present invention), P-B (present invention), P-$C_1$ (control), and P-D (control) were thus prepared.

Figure 4A:
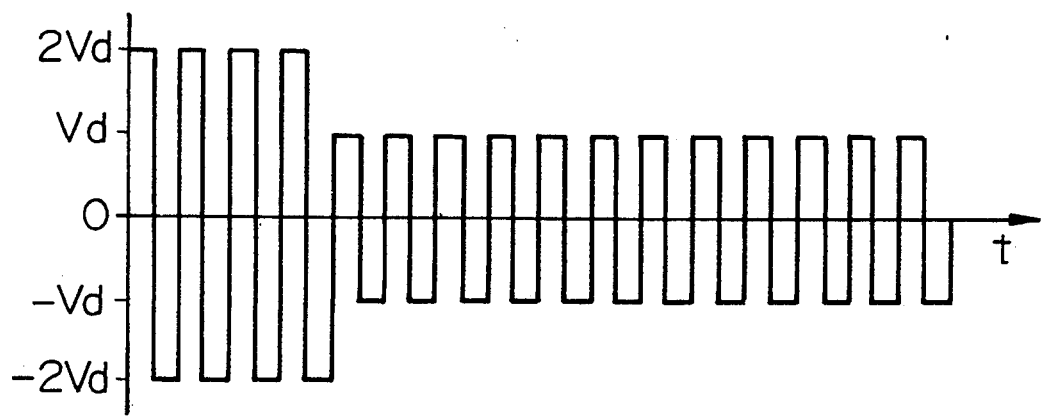
FIGS. 4a and 4b are graphs showing a pattern of liquid crystal driving signals used in Example 1.
Figure 4B:
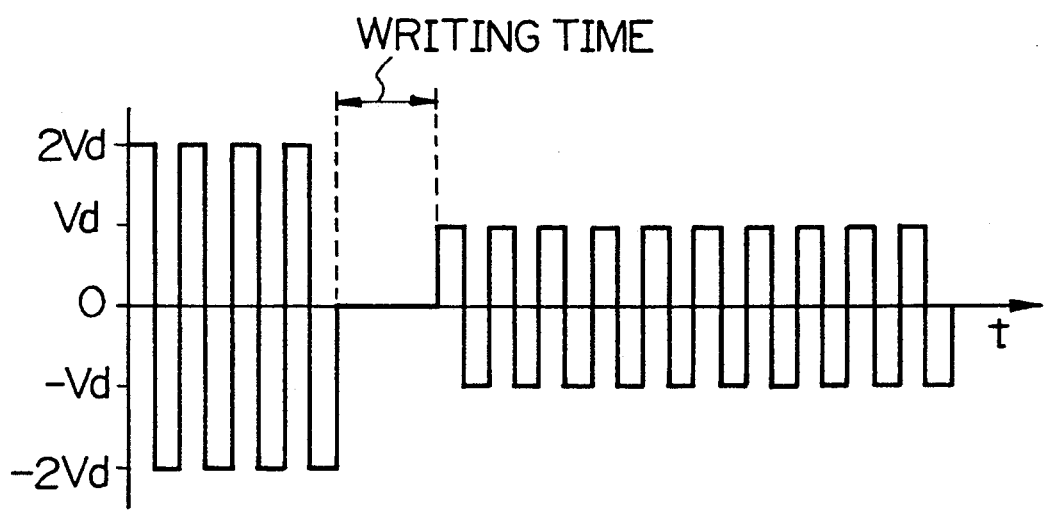
Figure 5:
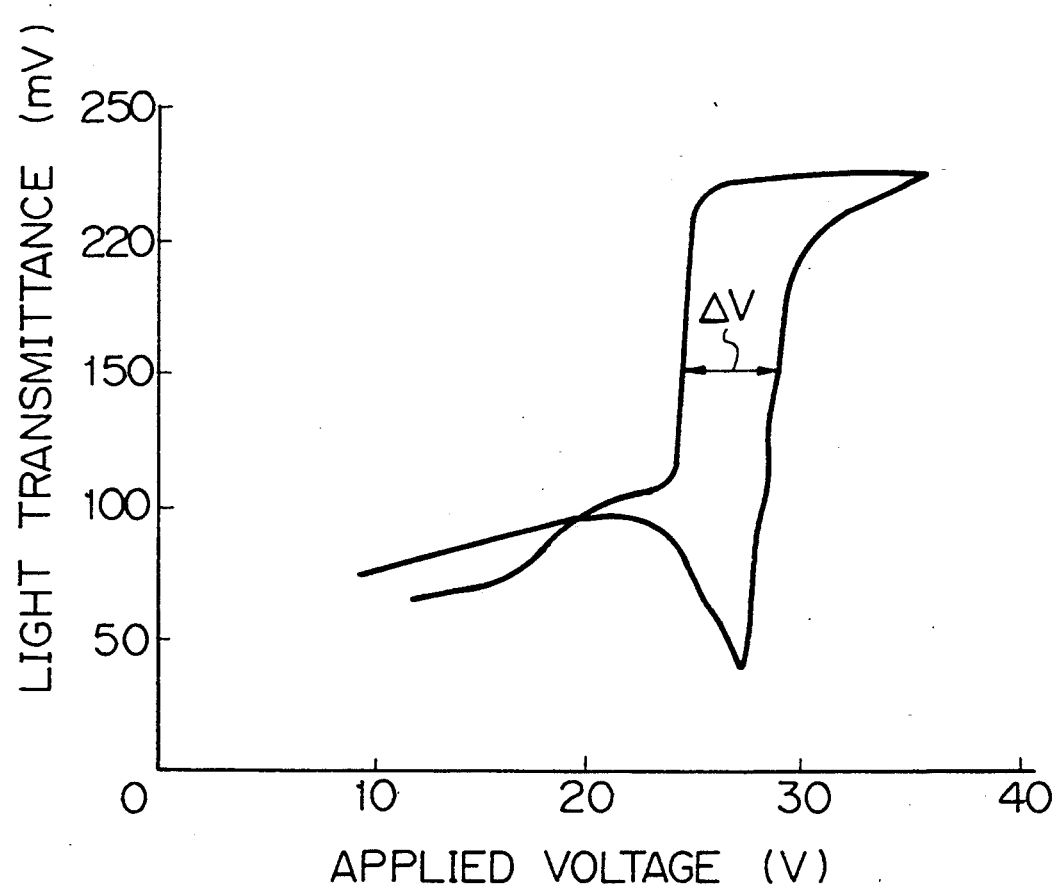
FIG. 5 is a graph illustrating the hysterisis curve of the liquid crystal display panel prepared in Example 1.

Each of these four liquid crystal display panels were tested to determine their voltage hysteresis width ($\Delta V$). First, a predetermined voltage $Vd_1$ was set, and the liquid crystal display panel was driven following the driving wave patterns shown in FIGS. 4a and 4b. After writing, the variation of the light transmittance of the panel was recorded as time versus variation of the light transmittance. Similarly, the time variation of the light transmittance of the panel was recorded upon application of a voltage $Vd_2$, which is slightly higher than the previously set voltage $Vd_1$. Similar recordings were repeated except that the applied voltage was gradually increased in such a manner that $Vd_3 \rightarrow Vd_4$, $Vd_4 \rightarrow Vd_5$, ..., until a phase transition from the cholesteric phase to nematic phase was caused. Subsequently, a high voltage sufficient to maintain the crystals in its nematic phase was applied to the panel, and then the applied voltage was gradually reduced. During reduction of the voltage, the time variation of the light transmittance of the panel was repeatedly recorded in the manner described above. The results of such recording were plotted in a graph of time versus variation of the light transmittance. Based on the plotted graph of time versus variation of light transmittance, another graph showing light transmittance (determined at a certain time lapse after writing) versus applied voltage was plotted. One of these plotted graphs is set forth in FIG. 5, which concerns the liquid crystal display panel P-B of the present invention. The light transmittance was determined using a photocell and is in mV, and the applied voltage is in volts.

The voltage hysteresis width ($\Delta V$) of each of the liquid crystal display panels was evaluated from the graph of light transmittance versus applied voltage. In this evaluation, the writing time was 6 ms/line, and the width was evaluated as 10 sec after writing. The results are summarized in the following Table I.

TABLE I

| Liquid crystal display panels | Hysteresis width ($\Delta V$) | Possible* writing speed (ms/line) |
|---|---|---|
| P-A | 0.9 | 4 |
| P-B | 2.5 | 3 |
| P-$C_1$ (control) | 0.3 | 6 |
| P-D (control) | 0 | 15 |

*The term "possible" was used herein to indicate that the writting speed varies depending upon the hysteresis width. Generally, the faster the writing speed, the narrower the hysteresis width.

The above results indicate that the display panels P-A and P-B prepared using the liquid crystal compositions of the present invention has larger hysteresis widths and faster writing speeds than the controls P-$C_1$ and P-D. The display panels of this invention are therefore compatible with scroll operation. In contrast, prior art display panels are not adapted to scroll operation in a large scale display since they require a long writing time for each scanning line. Further, unexpectedly, the display panels of this invention can have a satisfactory hysteresis width in spite of their shortened writing time, while, in prior art panels, shortening of the writing time tends to narrow the hysteresis width.

Example 2

The procedure of Example 1 was repeated except that the liquid crystal compositions were replaced by the following five liquid crystal compositions E, F, G, H, and I. Liquid crystal display panels P-E (present invention), P-F (present invention), P-G (present invention), P-H (control), and P-I (control) were produced.

The results are summarized in the following Table II.

TABLE II

| Liquid crystal display panels | Hysteresis width ($\Delta V$) | Possible writing speed (ms/line) |
|---|---|---|
| P-E | 3.3 | 3 |
| P-F | 1.5 | 4 |
| P-G | 2.7 | 3 |
| P-H (control) | 0.2 | 5 |
| P-I (control) | 1.1 | 5 |

It is evident from the above results that the display panels according to this invention exhibit satisfactory hysteresis widths and improved possible writing speed.

Example 3

The procedure of Example 1 was repeated except that, in this example, the liquid crystal composition $C_1$ was replaced with the liquid crystal composition $C_2$. Similar results were obtained.

For further understanding of this invention, the results of the above Examples 1 to 3 are summarized in the following Table III.

TABLE III

| Liquid crystal display Penals | Composition of liquid crystal compounds (% by weight) | | | | | | | | | |
|---|---|---|---|---|---|---|---|---|---|---|
| | Ester-type | | | | | | Cyclohexane-phenyl-type | | | |
| | ET | BH | CHi | ES | TH | Total | Cy-1 | Cy-2 | Cy-3 | Cy-4 | Total |
| P-A | | 36.4 | 12.1 | (51.5) | | 51.5 | | | | | |
| P-B | 16.3 | 19.6 | 11.9 | (16.3) | (9.8) | 26.1 | (9.8) | | (13.0) | (3.3) | 26.1 |

TABLE III-continued

| | | | | | | | | | | |
|---|---|---|---|---|---|---|---|---|---|---|
| P-E | 30.8 | 15.4 | 14.9 | (5.2) | (2.6) | 7.8 | (7.7) | (8.0) | (7.7) | 23.4 |
| P-F | 36.4 | | 12.1 | (51.5) | | 51.5 | | | | |
| P-G | | 45.6 | 12.8 | (15.1) | (7.6) | 22.7 | | | (18.9) | |
| P-H (control) | | | 13.0 | (69.6) | | 69.6 | | | (17.4) | |
| P-I (control) | | | 17.1 | (2.4) | | 2.4 | (12.2) | | (56.1) | 68.3 |
| P-C$_1$ (control) | | | 11.7 | (7.2) | (7.2) | 14.4 | (17.9) | | (39.3) | 57.2 |
| P-C$_2$ (control) | | | 11.7 | (7.2) | (7.2) | 14.4 | (17.9) | | (39.3) | 57.2 |
| P-D (control) | | | | (7.1) | | 7.1 | (42.6) | | | 42.6 |

| Liquid crystal display Penals | Composition of liquid crystal compounds (% by weight) | | | | | Characteristics | |
|---|---|---|---|---|---|---|---|
| | Heterocyclic type | | | AZ | CHo | ΔV (volts) | Writing speed (ms/line) |
| | DI | Py | Total | | | | |
| P-A | | | | | | 0.9 | 4 |
| P-B | | | | | | 2.5 | 3 |
| P-E | (5.1) | (2.6) | 7.7 | | | 3.5 | 3 |
| P-F | | | | | | 1.5 | 4 |
| P-G | | | | | | 2.7 | 3 |
| P-H (control) | | | | | | 1.1 | 5 |
| P-I (control) | (12.2) | | 12.2 | | | 0.2 | 5 |
| P-C$_1$ (control) | (16.7) | | 16.7 | | | 0.3 | 6 |
| P-C$_2$ (control) | | (16.7) | 16.7 | | | 0.3 | 6 |
| P-D (control) | (10.6) | | 10.6 | 24.8 | 14.9 | 0 | 15 |

Liquid crystal compounds:
ET ... Ethane-type;
BH ... Bicyclohexane-type;
CHi ... Chiral nematic type;
ES ... Ester-type;
TH ... thioester-type;

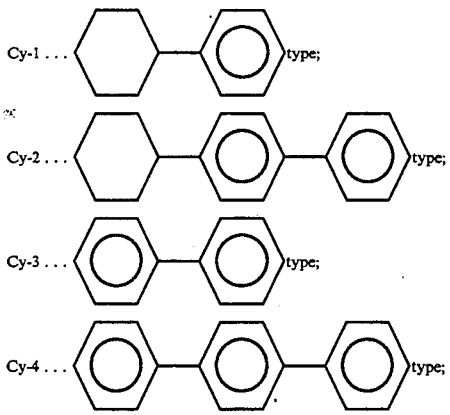

DI ... Dioxane-type;
Py ... Pyrimidine-type;
Az ... Azoxy-type, and;
CH$_0$ ... Cholesteric type.

We claim:

1. A liquid crystal display device comprising two parallel transparent substrates, each having a transparent electrode disposed on an inner surface thereof, a liquid crystal layer sandwiched between the inner surfaces of said transparent substrates and comprising a cholesteric-nematic phase transition-type liquid crystal composition with a positive dielectric anisotropy, a driver to drive the display device, and electrical circuitry arranged and constructed so that a first voltage higher than a second voltage can be applied at selected points to cause the liquid crystal layer to enter a first homeotropic state and thereafter the second voltage can be applied at said selected points to cause the liquid crystal to enter a second meta-stable homeotropic state, and so that a third voltage lower than said second voltage can be applied to alternative points to cause the liquid crystal layer to enter a focal conic state and thereafter the second voltage can be applied to said alternative points to maintain the focal conic state, the electrical circuitry arrangement being such that at all selected and alternative points, the same second voltage is applied to maintain the meta-stable homeotropic state at the selected points and the focal conic state at the alternative points, to thereby maintain a display image formed by said liquid crystal layer comprising the meta-stable homeotropic states and focal conic states, said cholesteric-nematic phase transition liquid crystal composition comprising a mixture of an ester-type liquid crystal compound and chiral nematic liquid crystal compound, having added thereto at least one of an ethane-type liquid crystal compound and bicyclohexane type liquid crystal compound, wherein the ethane-type liquid crystal compound has the formula:

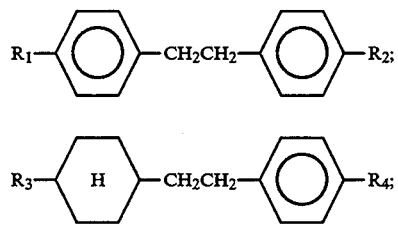

-continued

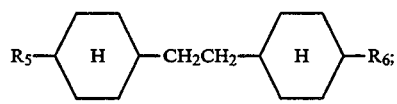

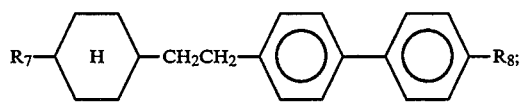

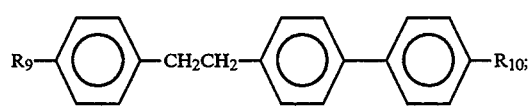

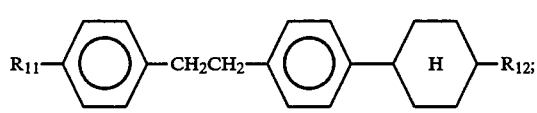

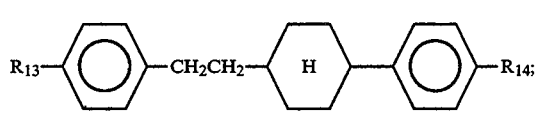

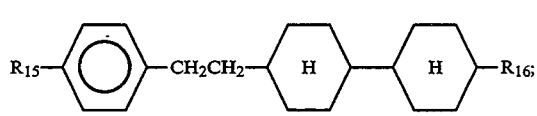

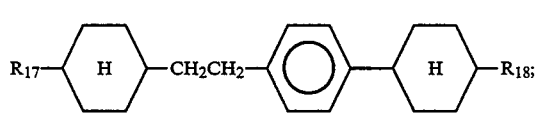

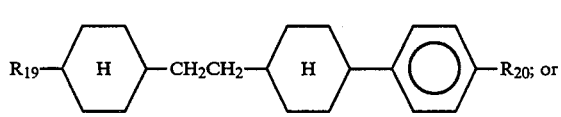

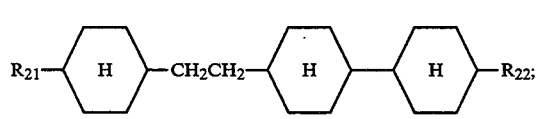

in which
$R_1$, $R_3$, $R_5$, and $R_7$ can be the same or different and each represents an alkyl group of 2 to 7 carbon atoms, $R_2$, $R_4$, $R_6$, and $R_8$ can be the same or different and each of 1 to 6 carbon atoms,

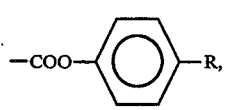

a fluorine atom, a bromine represents an alkyl group of 2 to 7 carbon atoms, an alkoxy group atom, or a cyano group, R represents an alkyl group of 2 to 7 carbon atoms, a fluorine atom or a bromine atom, $R_9$, $R_{11}$, $R_{13}$, $R_{15}$, $R_{17}$, $R_{19}$, and $R_{21}$ can be the same or different and each represents an alkyl group of 2 to 7 carbon atoms or an alkoxy group of 1 to 6 carbon atoms, and $R_{10}$, $R_{12}$, $R_{14}$, $R_{16}$, $R_{18}$, $R_{20}$, and $R_{22}$ can be the same or different and each represents an alkyl group of 2 to 7 carbon atoms, a fluorine atom, a chlorine atom, a bromine atom, or a cyano group, wherein the bicyclohexane-type liquid crystal compound has the formula:

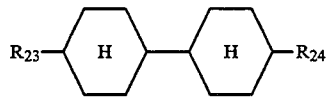

in which
$R_{23}$ represents an alkyl group of 2 to 7 carbon atoms and
$R_{24}$ represents an alkyl group of 2 to 7 carbon atoms or a cyano group, wherein the ester-type liquid crystal compound has the formula:

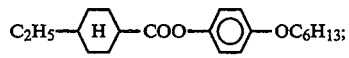

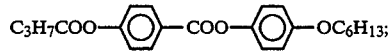

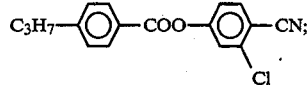

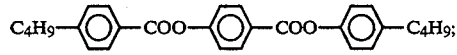

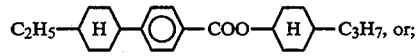

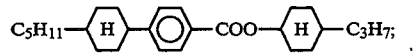

in which an oxygen atom of the central group —COO— can be optionally replaced by a sulfur atom, and
wherein the chiral nematic liquid crystal compound has the formula:

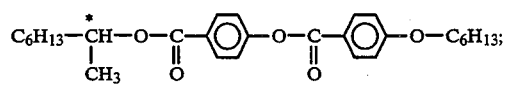

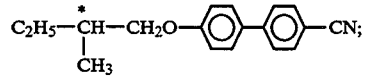

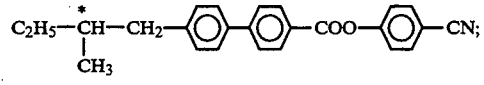

-continued

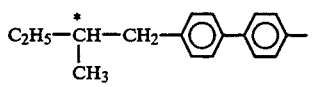

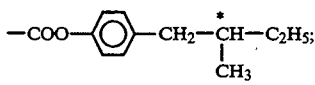

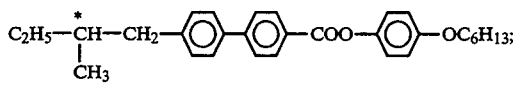

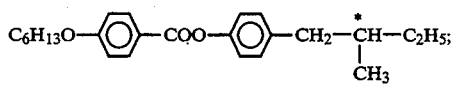

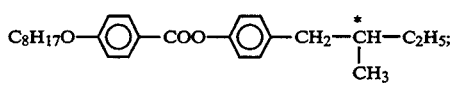

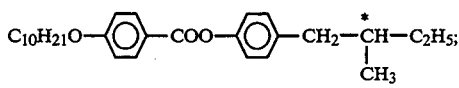

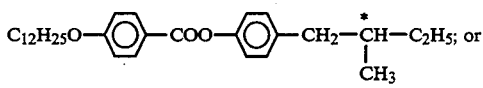

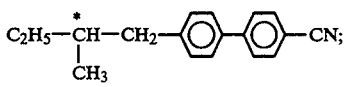

in which C* represents an asymmetric carbon atom.

2. A liquid crystal display device as set forth in claim 1, wherein the liquid crystal composition comprises a mixture of:
the ethane-type liquid crystal compound in an amount of 10% to 70% by weight,
the bicyclohexane-type liquid crystal compound in an amount of 10% to 60% by weight,
the ester-type liquid crystal compound in an amount of 15% to 85% by weight, and
the chiral nematic liquid crystal compound in an amount of 8% to 40% by weight based on the total weight of the liquid crystal composition.

3. A liquid crystal display device as set forth in claim 1, wherein said liquid crystal composition comprises a mixture of:
the ester-type liquid crystal compound in an amount of 22.7% to 51.5% by weight,
the chiral nematic liquid crystal compound in an amount of 12.1% to 12.8% by weight,
the bicyclohexane-type liquid crystal compound in an amount of 36.4% to 45.6% by weight based on the total weight of the liquid crystal composition.

4. A liquid crystal display device as set forth in claim 1, wherein said liquid crystal composition comprises a mixture of:
the ester-type liquid crystal compound in an amount of 7.8% to 26.1% by weight,
the chiral nematic type liquid crystal compound in an amount of 11.9% to 14.9% by weight,
the ethane-type liquid crystal compound in an amount of 16.3% to 30.8% by weight,
the bicyclohexane-type liquid crystal compound in an amount of 15.4% to 19.6% by weight based on the total weight of the liquid crystal composition.

5. A liquid crystal display device as set forth in claim 1, wherein said liquid crystal composition comprises a mixture of:
the ester-type liquid crystal compound in the amount of 51.5% by weight,
the chiral nematic liquid crystal compound in the amount of 12.1% by weight, and
the ethane-type liquid crystal compound in the amount of 36.4% by weight based on the total weight of the liquid crystal composition.

6. A liquid crystal device as set forth in claim 1, wherein the width of the hysteresis of phase transistion between the focal conic and homeotropic states in relation to applied voltage is 0.9 V or more.

7. A display device as set forth in claim 1 in which the ethane-type liquid crystal compound is included in an amount of 10% to 70% by weight based on the total weight of the liquid crystal composition.

8. A display device as set forth in claim 1 in which the ethane-type liquid crystal compound is included in an amount of 10% to 40% by weight based on the total weight of the liquid crystal composition.

9. A display device as set forth in claim 1 in which the bicyclohexane-type liquid crystal compound is included in an amount of 10% to 60% by weight based on the total weight of the liquid crystal composition.

10. A display device as set forth in claim 1 in which the bicyclohexane-type liquid crystal compound is included in an amount of 20% to 40% by weight based on the total weight of the liquid crystal composition.

11. A display device as set forth in claim 1 in which the chiral nematic liquid crystal compound is included in an amount of 10% to 30% by weight based on the total weight of the liquid crystal composition.

12. A display device as set forth in claim 1 in which the ester-type liquid crystal compound is included in an amount of 15% to 85% by weight based on the total weight of the liquid crystal composition.

13. A display device as set forth in claim 1 in which the ester-type liquid crystal compound is included in an amount of 20% to 55% by weight based on the total weight of the liquid crystal composition.

14. A display device as set forth in claim 1, wherein the liquid crystal composition includes other type liquid crystal compounds selected from the group consisting of biphenyl-type, dioxane-type, pyrimidine-type, cyclohexane-benzene type, terphenyl-type and cyclohexane-biphenyl-type liquid crystal compounds, and mixtures thereof.

15. A display device as set forth in claim 14 in which the biphenyl-type liquid crystal compound is included in an amount of up to 20% by weight based on the total weight of the liquid crystal composition.

16. A display device as set forth in claim 14 in which the dioxane-type liquid crystal compound is included in an amount of up to 20% by weight based on the total weight of the liquid crystal composition.

17. A display device as set forth in claim 14 in which the pyrimidine-type liquid crystal compound is included in an amount of up to 15% by weight based on the total weight of the liquid crystal composition.

18. A display device as set forth in claim 14 in which the cyclohexane-type liquid crystal compound is included in an amount of up to 20% by weight based on the total weight of the liquid crystal composition.

19. A display device as set forth in claim 14 in which the terphenyl-or cyclohexanebiphenyl-type liquid crystal compound is included in an amount of up to 10% by weight based on the total weight of the liquid crystal composition.

20. A liquid crystal display device comprising two parallel transparent substrates, each having a transparent electrode disposed on an inner surface thereof, a liquid crystal layer sandwiched between the inner surfaces of said transparent substrates and comprising a cholesteric-nematic phase transition-type liquid crystal composition with a positive dielectric anisotropy, a driver to drive the display device, and electrical circuitry arranged and constructed so that a first voltage ($V_H$) higher than a second voltage ($Vu^{20}$) can be applied at selected points to cause the liquid crystal layer to enter a first homeotropic state (H) and thereafter a third voltage (Vd) can be applied at said selected points to cause the liquid crystal to enter a second meta-stable homeotropic state (H'), and so that a fourth voltage lower than a fifth voltage ($Vd^{90}$) can be applied to alternative points to cause the liquid crystal layer to enter a focal conic state (Fo or F) and thereafter the third voltage (Vd) can be applied to said alternative points to maintain the focal conic state (F), the electrical circuitry arrangement being such that at all selected and alternative points, the same third voltage (Vd) is applied to maintain the meta-stable homeotropic state (H') at the selected points and the focal conic state (F) at the alternative points, to thereby maintain a display image formed by said liquid crystal layer comprising the meta-stable homeotropic states (H') and focal conic states (F), said cholesteric-nematic phase transition liquid crystal composition comprising a mixture of an ester-type liquid crystal compound and chiral nematic liquid crystal compound, having added thereto at least one of an ethane-type liquid crystal compound and bicyclohexane type liquid crystal compound, wherein the ethane-type liquid crystal compound has the formula:

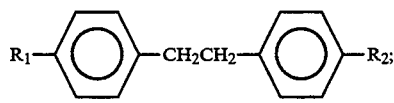

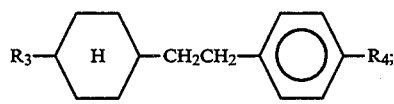

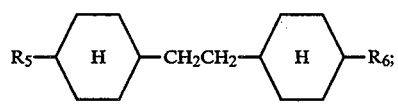

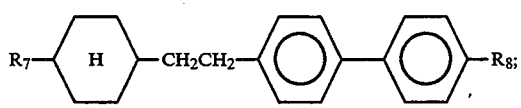

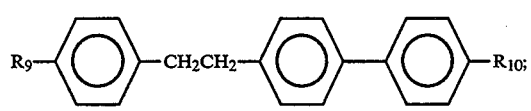

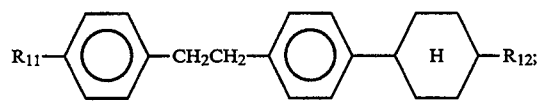

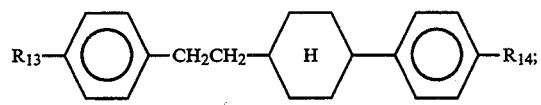

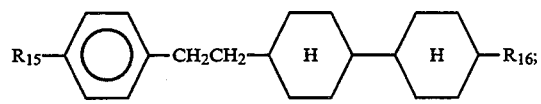

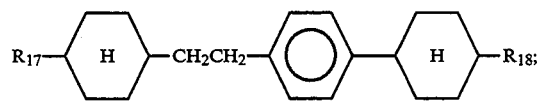

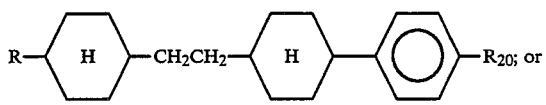

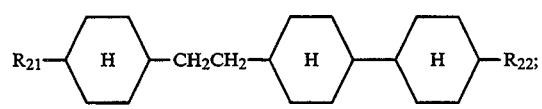

in which
$R_2$, $R_3$, $R_5$, and $R_7$ can be the same or different and each represents an alkyl group of 2 to 7 carbon atoms, $R_2$, $R_4$, $R_6$, and $R_8$ can be the same or different and each of 1 to 6 carbon atoms,

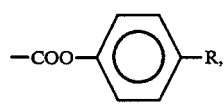

fluorine atom, a bromine atom, or a cyano group,

R represents an alkyl group of 2 to 7 carbon atoms, a fluorine atom or a bromine atom, $R_9$, $R_{11}$, $R_{13}$, $R_{15}$, $R_{17}$, $R_{19}$, and $R_{21}$ can be the same or different and each represents an alkyl group of 2 to 7 carbon atoms or an alkoxy group of 1 to 6 carbon atoms, and $R_{10}$, $R_{12}$, $R_{14}$, $R_{16}$, $R_{18}$, $R_{20}$, and $R_{22}$ can be the same or different and each represents an alkyl group of 2 to 7 carbon atoms, a fluorine atom, a chlorine atom, a bromine atom, or a cyano group, wherein the bicyclohexane-type liquid crystal compound has the formula:

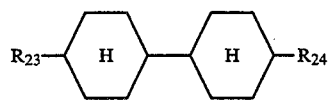

in which
$R_{23}$ represents an alkyl group of 2 to 7 carbon atoms and
$R_{24}$ represents an alkyl group of 2 to 7 carbon atoms or a cyano group, wherein the ester-type liquid crystal compound has the formula:
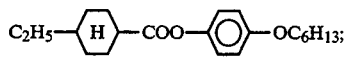
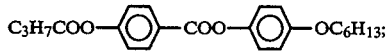
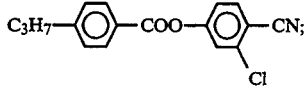
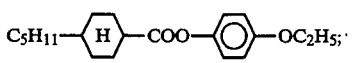
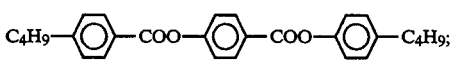
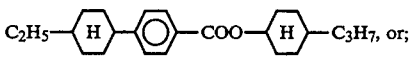
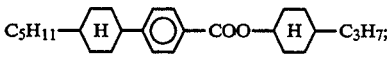
in which an oxygen atom of the central group —COO— can be optionally replaced by a sulfur atom, and
wherein the chiral nematic liquid crystal compounds has the formula:
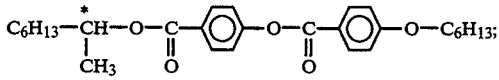
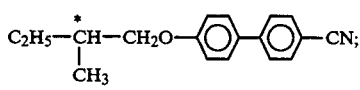
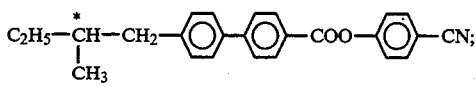
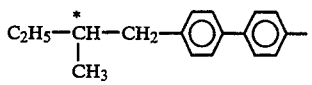
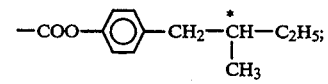
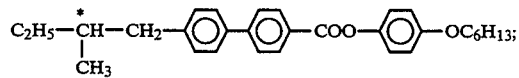
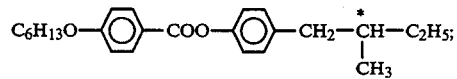
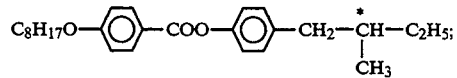
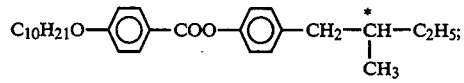
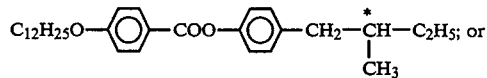
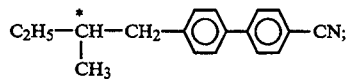
in which C* represents an asymmetric carbon atom.
* * * * *

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

On the title page: Item [56]
delete "Guhjima" and substitute --Gunjima--;

line 12, delete "Andrews et al." and substitute --Gray et al.--.

Column 1, line 23, delete "composition" and substitute --compositions--;

line 25, delete "composition" and substitute --compositions--;

line 27, delete "East" and substitute --fast--;

line 55, delete "a need for";

line 60, delete "devices Such" and substitute --devices. Such--.

Column 2, line 2, delete "DSM-type" and substitute --X-Y dot matrix-type DSM and TN display devices.--;

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

line 3, delete "and TN-type display devices of an X-Y dot matrix-type.";

line 16, delete "while large" and substitute --while DSM and TN type--;

line 17, delete "display" and substitute --display 5--;

line 32, delete "of picture" and substitute --of a picture--;

line 43, "Liquid" and substitute --liquid--;

line 47, after "composition" insert --which--.

Column 3, line 1, delete "system" and substitute --systems--;

line 7, delete "disclosed such" and substitute --disclosed in such--;

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

line 11, delete "of 4-" and substitute --of a 4---;

line 18, delete "and";

line 26, delete "conditions" and substitute --conditions,--;

line 66, delete "of".

Column 4, line 9, delete "of";

line 20, delete "the".

Column 5, line 5, delete "their" and substitute --the--.

Column 7, line 14, delete "having," and substitute --having--;

line 23, delete "invention" and substitute --invention,--;

line 56, (composition 4), delete "$C_7H_{15}$" and substitute --$C_5H_{11}$--;

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

line 61, (composition 5), delete "$C_2H_5$" and substitute --$C_7H_{15}$--.

Column 9, line 61, delete "cyclohexane-benzene type," and substitute --cyclohexanebenzene-type--.

Column 10, line 13, delete "these compounds" and substitute --the amount of these compounds,--;

line 20, delete "crystal," and substitute --crystals,--;

line 23, delete "the" (second occurrence) and substitute --these--;

line 50, delete "useful" and substitute --used--;

line 64, delete "as".

Column 11, line 2, delete "viame-" and substitute --via a me--;

line 4, delete "At F" and substitute --At the F--;

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

line 17, delete "the sub-" and substitute --the panel sub---;

line 18, delete "panel";

line 43, delete "pane" and substitute --panel--;

line 51, delete "made".

Column 12, line 21, delete "is";

line 39, delete "1 its" and substitute --1 in its--.

Column 22, (Composition H) line 5, delete the following:

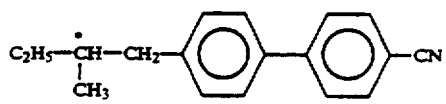

and substitute

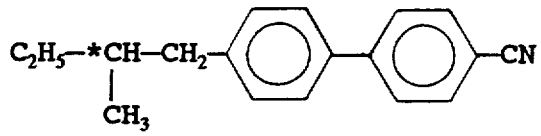

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

Column 23, (Composition I) line 10, delete the following:

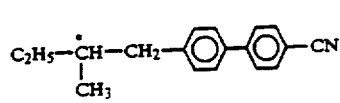   13.0 and substitute

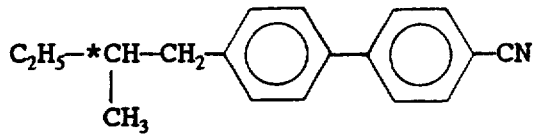   13.0 line 16, delete "a ITO" and substitute --an ITO--;

line 50, delete "recording" and substitute --recordings--.

Column 24, line 26, after "Further," insert --and--.

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

Column 25, line 55, delete "can" and substitute --may--;

line 57, delete "can" and substitute --may--.

Column 27, line 46, delete "can" and substitute --may--;

line 49, delete "can" and substitute --may--;

line 50, delete "each of" and substitute --each represents an alkyl group of 2 to 7 carbon atoms, an alkoxy group of--;

line 58, delete "represents an alkyl group of";

line 59, delete "2 to 7 carbon atoms, an alkoxy group";

line 67, delete "can" and substitute --may--.

Column 31, line 19, delete "can" and substitute --may--;

line 25, delete "can" and substitute --may--.

UNITED STATES PATENT AND TRADEMARK OFFICE
CERTIFICATE OF CORRECTION

PATENT NO. : 5,422,033
DATED : June 6, 1995
INVENTOR(S) : AKIHIRO MOCHIZUKI et al.

It is certified that error appears in the above-indentified patent and that said Letters Patent is hereby corrected as shown below:

Column 32, line 33, delete "$R_2$" and substitute --$R_1$--;

line 33, delete "can" and substitute --may--;

line 36, delete "can" and substitute --may--;

line 37, delete "each of" and substitute --each represents an alkyl group of 2-7 carbon atoms, an alkoxy group of--;

line 44, before "fluorine" insert --a--;

line 47, delete "can" and substitute --may--;

line 51, delete "can" and substitute --may--.

UNITED STATES PATENT AND TRADEMARK OFFICE
CERTIFICATE OF CORRECTION

PATENT NO. : 5,422,033
DATED : June 6, 1995
INVENTOR(S) : Akihiro Mochizuki et al It is certified that error appears in the above-indentified patent and that said Letters Patent is hereby corrected as shown below:

Column 33, line 38, delete "compounds" and substitute --compound --.

Signed and Sealed this

Nineteenth Day of December, 1995

Attest:

BRUCE LEHMAN

*Attesting Officer*     *Commissioner of Patents and Trademarks*